United States Patent [19]
Ohta et al.

[11] Patent Number: 5,815,684
[45] Date of Patent: Sep. 29, 1998

[54] CONFIGURATION SIMULATING METHOD EMPLOYING STRING MODEL FOR SIMULATING LAYER CONFIGURATION OF SILICON WAFER

[75] Inventors: Toshiyuki Ohta; Hiroaki Yamada; Toshiki Shinmura, all of Tokyo, Japan

[73] Assignee: NEC Corporation, Tokyo, Japan

[21] Appl. No.: 527,452

[22] Filed: Sep. 13, 1995

[30] Foreign Application Priority Data

Dec. 20, 1994 [JP] Japan .................................. 6-317147

[51] Int. Cl.[6] ............................................. G06F 17/18
[52] U.S. Cl. ...................... 395/500; 395/557; 364/578; 364/491; 364/551.01; 364/554; 364/468.03; 204/192.13; 204/298.03; 204/298.31
[58] Field of Search .................................. 395/500, 557; 364/578, 554, 551.01, 491, 468.03; 204/192, 192.13, 298.17, 298.31, 298.03

[56] References Cited

U.S. PATENT DOCUMENTS

| 4,544,891 | 10/1985 | Karwacki | 324/304 |
| 5,242,566 | 9/1993 | Parker | 204/298.2 |
| 5,320,728 | 6/1994 | Tepman | 204/192.12 |

OTHER PUBLICATIONS

M. Fujinaga et al., *Applied Physics* 62(11): 1104–1110 (1993).

Primary Examiner—Kevin J. Teska
Assistant Examiner—Thai Phan
Attorney, Agent, or Firm—Foley & Lardner

[57] ABSTRACT

A configuration simulating method for a layer deposited on a silicon wafer comprising the steps of: (a) generating a string of modeling data, obtained by connecting coordinate points on a contour of a section, wherein the section is obtained by cutting a plane perpendicular to an open surface of a cylindrical contact hole, for modeling a configuration of said cylindrical contact hole formed within said silicon wafer; (b) extracting flux vectors, flowing into a predetermined one of said coordinate points on the string of modeling data, by analyzing a flux vector of particles to be deposited on said silicon wafer, wherein said particles are present in a gas phase; (c) deriving an intersection of the straight line extended from said coordinate point in the direction of said flux vector; (d) judging whether said flux vector becomes null due to a shadow effect related to said cylindrical contact hole; (e) moving from said predetermined one of said coordinate points to another of said coordinate points corresponding to the projection of said flux vector on the plane, when said flux vector is judged as not becoming null; (f) repeating steps (a) through (e) until all of the flux vector flowing into said coordinate point has been extracted; and (g) repeating steps (a) through (e) until all coordinate points have been selected.

15 Claims, 4 Drawing Sheets

CONFIGURATION SIMULATING METHOD EMPLOYING STRING MODEL FOR SIMULATING LAYER CONFIGURATION OF SILICON WAFER

BACKGROUND OF THE INVENTION

1. Field of the Invention

The present invention relates generally to a configuration simulating method for simulating layer configuration upon forming a layer on a silicon wafer. More specifically, the invention relates to a configuration simulation method for performing simulation employing a string model.

2. Description of the Related Art

Configuration simulations of layer configuration of a wafer employing a method of sputter deposition, CVD (Chemical Vapor Deposition) and so forth have been performed. In such configuration simulation, variation of configuration due to formation of a layer is simulated by calculating a flux of a particle inciding on the surface and calculating variation magnitude of the surface configuration.

As a method for modeling configuration of an objective article for simulation, there are a method employing a string model and a method employing a cell removal model. In either case, there are methods employing a two-dimensional model and a three dimensional model.

Here, in the configuration simulation employing the two-dimensional model, inciding flux is projected on a two-dimensional space. Therefore, a problem is encountered in that a large error relative to an actual configuration may be caused when a proportion of flux inciding substantially perpendicular to the two-dimensional plane. Accordingly, in simulation of layer configuration of the wafer, it becomes necessary to perform simulation with employing the three-dimensional model.

On the other hand, when the string model is employed as a method for making analysis for configuration of the three-dimensional model, a problem is encountered in that lines forming the string model overlap or the length of the line becomes longer or shorter during calculation for simulation. Thus, loop deletion or segment control becomes necessary, thus making the process more complicated. A further problem is encountered in whether conservation of mass is accurately performed or not.

When modeling is performed employing cell removal model, the problems as set forth above will never be caused. On the other hand, a difficulty of expressing oblique configuration caused in employing the cell removal model, can be solved by a technology for expressing the configuration with isosbetic surface. This type of technology known in the art has been disclosed in "Applied Physics", Vol. 62, No. 11 (Fujinagaga, Kotani, 1993, Applied Physics Association). In the above-identified publication, as a method for expressing three-dimensional configuration, a technology, in which interpolation is performed on the basis of three-dimensional concentration distribution to obtain isosbetic surface and calculation of the configuration is performed, is disclosed. Also, in the above-identified publication, analysis is performed for layer configuration by sputter deposition employing the prior art. In this example of analysis, without considering collision of particles, calculation of configuration is performed by three-dimensional calculating depth angle of a sputter target at the corner portion of a contact hole.

However, the simulation employing the cell removal model of the three-dimensional configuration as set forth above, holds a defect to take unacceptably long period in calculation. Namely, by increasing of contact point data for one direction from two-dimension to three-dimension, not only the amount of calculation is increased corresponding to increasing of the contact point data but also processes for indicating relationship between data are increased. Therefore, for example, if the number of contact points is increased to be hundred times, the increasing of the calculation period exceeds hundred times. Then, for precisely expressing the configuration of the objective article for simulation, it is necessary to increase number of data as much as possible. This results in expansion of the analyzing period.

On the other hand, in the technology for expressing the surface configuration by the above-mentioned isosbetic surface, data processing of the configuration becomes complicated, and requires integrating calculation of the depth angle of the sputter target at respective points of the three-dimensional configuration model, the calculation period is further expanded.

SUMMARY OF THE INVENTION

It is an object of the present invention to solve the problems as set forth above and to provide a configuration simulation method realizing shortening of calculation period.

According to the first aspect of the invention, a configuration simulating method for a layer deposited on a silicon wafer comprises the steps of:

generating a string data obtained by connecting coordinate points on the contour of a section obtained by current by a plane perpendicular to an opening surface of a cylindrical contact ole for modeling a configuration of the contact hole formed within the silicon wafer;

extracting flux vectors flowing into a predetermined one of the coordinate points on the generated string model by analyzing flux vector of particles to be deposited on the silicon wafer present in a gas phase;

making judgement whether the flux becomes null due to shadow effect relative of the contact hole; and moving the coordinate point in the amount corresponding to the obtained vector amount by projecting the flux vector on the plane, at which the contact hole is cut when said flux vector is judged as effective.

In this case, it is preferred that the simulation method further comprises:

a step of executing respective of the processes with respect to all of the flux vector flowing into the coordinate point, and a step of executing respective of the processes with respect to a new coordinate point after moving of the coordinate point.

The step of generating the string model performing modeling with the string data obtained by connecting the coordinate points on the contour of the section cut by the plane including a center line in the depth direction of the contact hole.

The step of making judgement whether the flux vector may become null due to shadow effect comprises:

a step of deriving intersection between a straight line extending in the direction of the flux vector from the coordinate point and the opening surface of the contact hole; and a step of making judgement whether the flux vector becomes null or not when a distance from the center of the opening surface to the intersection is greater than a radius of the opening surface.

The step of making analysis of the flux vector, the analysis of the flux vector on the basis of the following equation:

$$J = e \cdot g(\theta)S / \int_0^n R^2 g(\theta)\sin\theta d\theta$$

In the simulation method, the step of generating the flux vector forms a model by the obtained with the string data by connecting the coordinate points on the contour of the section by cutting with the plane including the center line in the direction of the depth of the contact hole, and the step of making judgement whether the flux vector becomes null due to shadow effect or not includes a step of obtaining intersection between the straight line extending from the coordinate point in the direction of the flux vector; and a step of making judgement that the flux vector becomes null due to the shadow effect when a distance from the center of the opening surface to the intersection by comparing a distance from the center of opening surface of the contact hole and the radius of the opening surface of the contact hole.

The step of making analysis of the flux vector may perform flux vector analysis on the basis of the paths of the derived particle statistically employing a Monte Carlo method.

The step of generating the flux vector may form a model by the obtained with the string data by connecting the coordinate points on the contour of the section by cutting with the plane including the center line in the direction of the depth of the contact hole, and the step of making judgement whether the flux vector becomes null due to shadow effect or not includes a step of obtaining intersection between the straight line extending from the coordinate point in the direction of the flux vector; and a step of making judgement that the flux vector becomes null due to the shadow effect when a distance from the center of the opening surface to the intersection by comparing a distance from the center of opening surface of the contact hole and the radius of the opening surface of the contact hole.

According to the second aspect of the invention, a configuration simulating method for a layer deposited on a silicon wafer comprises the steps of:

generating a string data obtained by connecting coordinate points on the contour of a section obtained by current by a plane perpendicular to an opening surface of a cylindrical contact ole for modeling a configuration of the contact hole formed within the silicon wafer;

extracting flux vectors flowing into a predetermined one of the coordinate points on the generated string model by analyzing flux vector of particles to be deposited on the silicon wafer present in a gas phase;

deriving an intersection of the straight line extended from the coordinate point in the direction of the flux vector;

making judgement whether the flux becomes null due to shadow effect relative of the contact hole;

moving the coordinate point in the amount corresponding to the obtained vector amount by projecting the flux vector on the plane, at which the contact hole is cut when the flux vector is judged as effective;

executing respective the processes with respect to all of the flux vector; and executing respective processes with respect to the new contact points with respect to the coordinate point after moving the coordinate point.

According to the third aspect of the invention, configuration simulating system for a layer deposited on a silicon wafer comprises:

means for generating a string data obtained by connecting coordinate points on the contour of a section obtained by current by a plane perpendicular to an opening surface of a cylindrical contact ole for modeling a configuration of the contact hole formed within the silicon wafer;

means for extracting flux vectors flowing into a predetermined one of the coordinate points on the generated string model by analyzing flux vector of particles to be deposited on the silicon wafer present in a gas phase;

means for making judgement whether the flux becomes null due to shadow effect relative of the contact hole;

means for moving the coordinate point in the amount corresponding to the obtained vector amount by projecting the flux vector on the plane, at which the contact hole is cut when the flux vector is judged as effective;

means for executing respective of the processes with respect to the new coordinate point after moving of the coordinate point.

The simulation system includes means for making judgement whether the flux vector is null due to shadow effect;

means for deriving an intersection by comparing a distance from the center of the opening surface of the contact hole with the radius of the opening surface of the contact hole.

At the means for making analysis of the flux vector, the analysis of the flux vector on the basis of the following equation:

$$J = e \cdot g(\theta)S / \int_0^n R^2 g(\theta)\sin\theta d\theta$$

The means for making analysis of the flux vector may have means for making analysis of the flux vector on the basis of the paths of the particles statistically calculated employing the Monte Carlo method.

Other objects, features and advantages will become apparent from the description given hereinafter.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In the instance application, well-known structures are not shown in detail in order to avoid unnecessarily obscuring the present invention.

Figure 1:
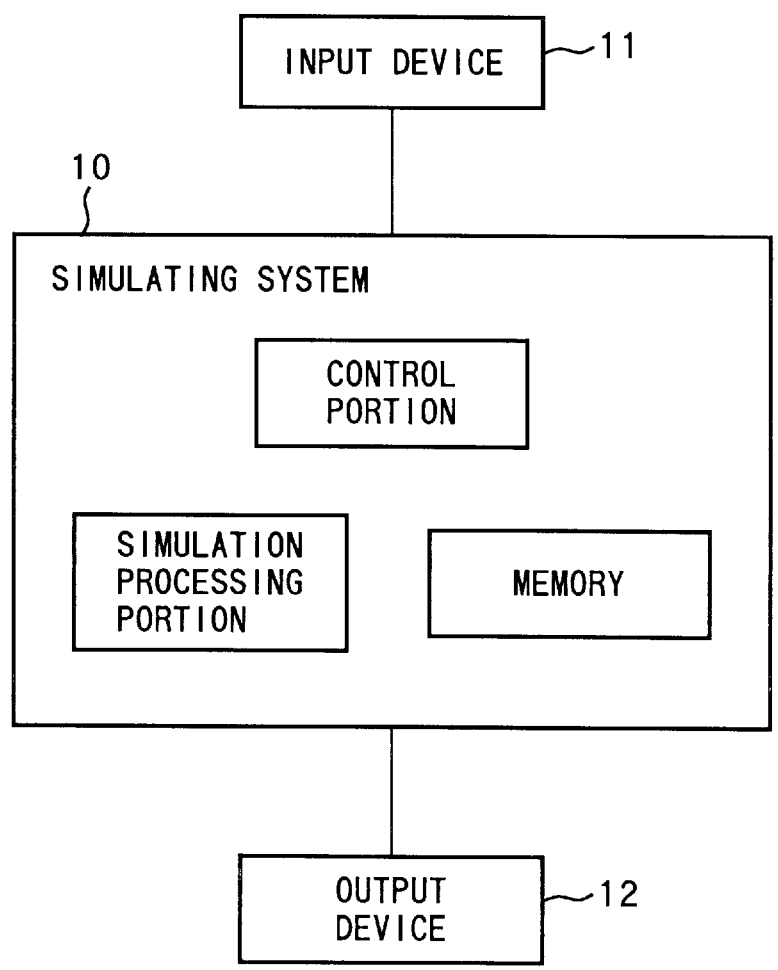
FIG. 1 is a block diagram showing a construction of a simulation system for realizing the preferred embodiment of a configuration simulating method according to the present invention.

FIG. 1 is a block diagram showing a construction for realizing the preferred embodiment of a configuration simulating method according to the present invention. As shown, the shown embodiment of the configuration simulating method is realized by executing a simulation program on a processor of a computer-based simulation system 10. In FIG. 1, an input device may comprise a keyboard, mouse or so forth, and an output device 12 is a display device, printer or so forth.

Figure 2:
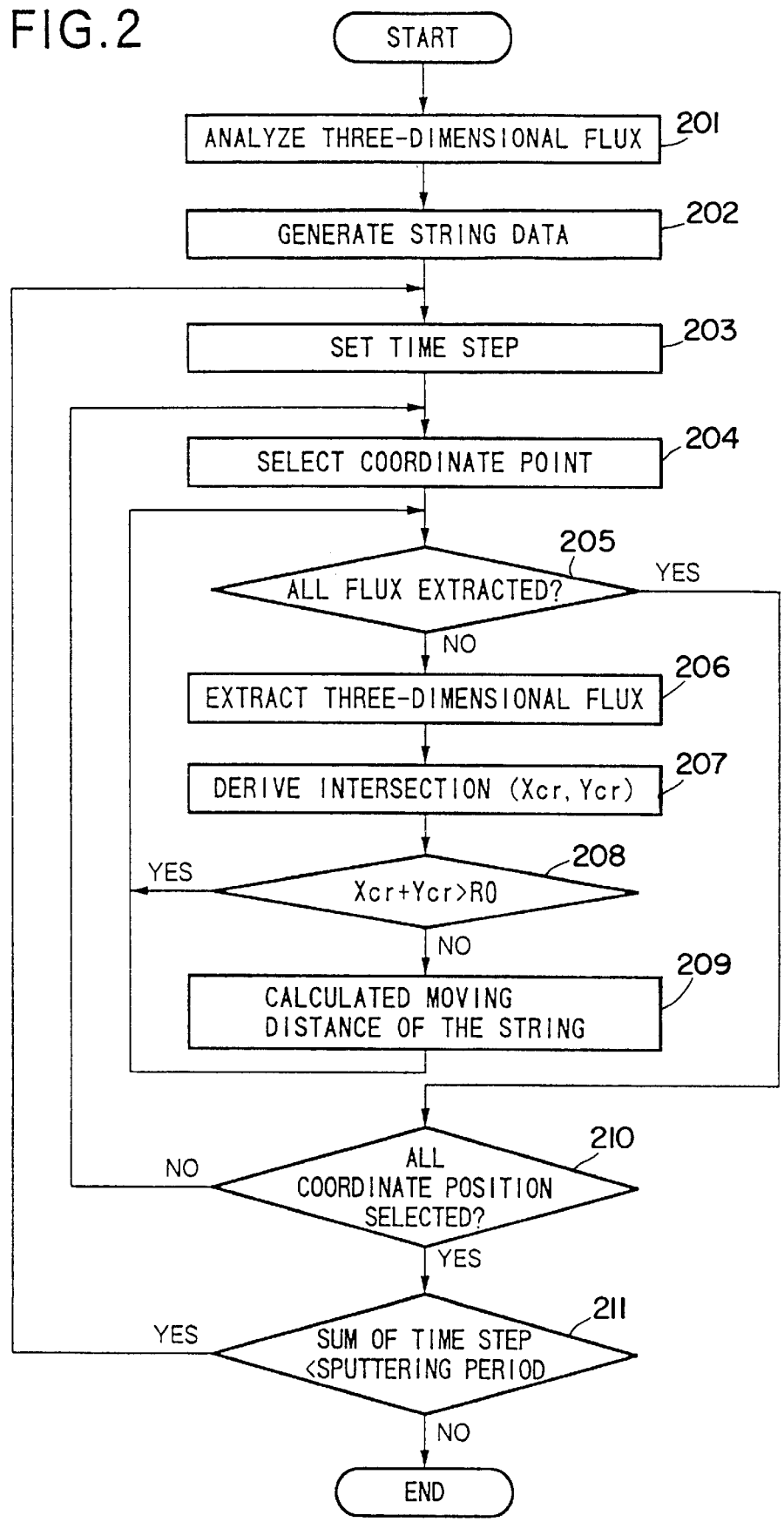
FIG. 2 is a flowchart showing a flow of operation by the preferred embodiment of the configuration simulating method according to the invention.

FIG. 2 is a flowchart showing a flow of operation by the shown embodiment of a simulation method.

In the shown embodiment, discussion will be given for an operation for simulation in the case where a depositing particle is deposited on a silicon wafer by way of sputter deposition. A sectional configuration of a contact hole formed in the silicon wafer is calculated employing a two-dimensional string model, and only judgement of flux from a gas phase and shadow effect are calculated three-dimensional.

At first, three-dimensional flux in a gas phase of depositing particle in a sputtering device is analyzed (step 201). This analysis may be performed by various methods, such as by deriving flux by applying an appropriate function, by deriving path of respective particles by a Monte Carlo method.

Next, a string data is generated by connecting respective coordinate points of contour line of the section obtained by cutting a plain including a center line in the depth direction of the contact holes on the silicon wafer (step 202). The configuration of the contact hole is modeled employing the data.

Next, a time step $\Delta t$ for calculating moving distance between string point set out latter is set (step 203). The time step $\Delta t$ is fine period divided by an execution period of deposition process by the sputtering device. Accordingly, sum of the all of the time steps $\Delta t$ is equal to the execution period of deposition process.

Next, one coordinate point is selected (step 204). Flux vector J flowing into this point is extracted (steps 205, 206).

Next, with respect to the each of the extracted flux, presence and absence of three dimensional shadow effect, judgement is made utilizing axial symmetricity of the contact hole. Namely, a coordinate (Xcr, Ycr) obtained by an intersection between a straight line extended in the direction of the flux vector J from a coordinate point (xn, Yn, 0) and the upper surface of the contact hole, namely the Z plane (Y=Yk), is obtained (step 207). Judgement is made that the particle by the shadow effect is not incide when the coordinate satisfies the condition of:

$$Xcr^2 + Ycr^2 > Ro^2$$

(Ro is a radius of the contact hole) (step 208).

When judgement is made that the shadow effect is caused, the process returns to the step 205 to make judgement whether process is performed for all of the flux flowing into the coordinate points. If there is a flux which has not been processed, judgement of the presence or absence of the shadow effect is made with respect to the relevant flux.

On the other hand, when the condition of the above-mentioned equation is not satisfied with respect to the obtained intersection (Xcr, Ycr), and thus judgement is made that no shadow effect occurs, the moving distance of the coordinate $\Delta r=(\Delta X, \Delta Y)$ is derived by:

$$\Delta X = K \times \Delta t \times Jx/|J|$$

$$\Delta Y = K \times \Delta t \times Jy/|J|$$

at a step 209. Here, K is a constant, $\Delta t$ is each time step set at the step 203. On the other hand, the flux is assumed as J=(Jx, Jy, Jz).

Next, returning to the step 205, judgement is made whether all of the processes through the steps 206 to 209 are performed for all of the flux flowing into the coordinate point in question. The operation is repeated until the processes are completed with respect to all of the flux.

When judgement is made that the foregoing processes are completed with respect to all of the flux flowing into the relevant coordinate point, next coordinate point is selected to perform calculation through the steps 205 to 209. Similarly, operation is repeated for all of the coordinate points (step 210).

Once the calculation through the steps 205 to 209 is completed with respect to all of the coordinate points, foregoing steps 204 to 210 are executed with respect to the next time step $\Delta t$. Similarly, at all of the time steps obtained by dividing processing period of the deposition process by the sputtering device, the foregoing operation is repeated (steps 211).

Figure 3:
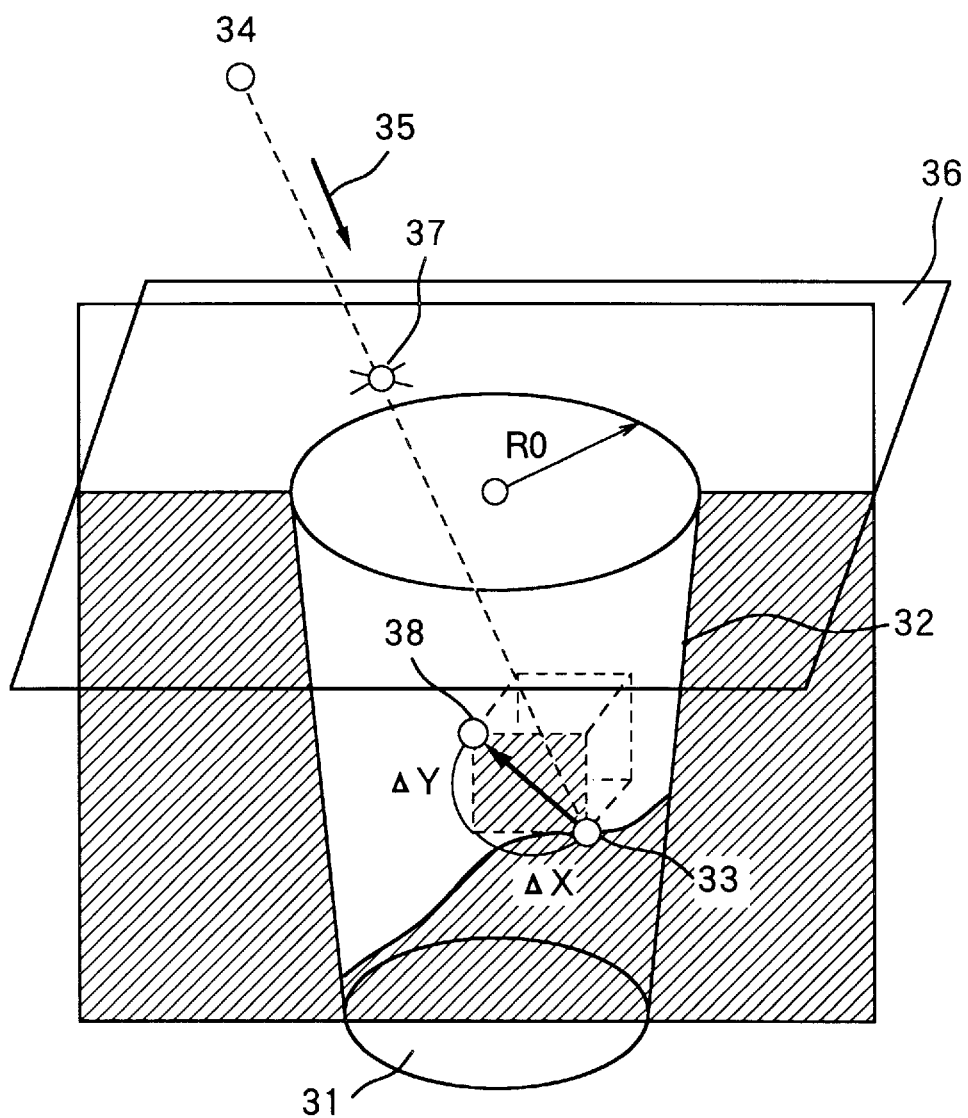
FIG. 3 is a conceptual illustration showing a condition where the shown embodiment is applied for simulation of buried configuration of a contact hole by deposition.

FIG. 3 is a conceptual illustration of the condition of the condition of simulation for the configuration of the contact hole when the deposition process is performed from deposition source for the silicon wafer. It should be noted that the pressure during deposition is assumed to be quite low and thus the depositing particles is assumed to reach the silicon wafer without colliding any background gas particles.

As shown in FIG. 3, analysis is made for the three-dimensional flux of the depositing particles in the gas phase in the sputtering device (step 201). Here, as set out later, the flux vector is calculated employing predetermined function.

Next, a string data connecting respective coordinate points of the contour line 32 obtained by cutting at a plane extending through center line in the depth direction of the contact hole 31 (step 202) Then, the time step $\Delta t$ is set (step 203), and the coordinate point 33 is extracted (step 204) and the flux vector 35 from the deposition source 34 is calculated (steps 205, 206). Here, the flux vector 35 is derived from the following equation (1):

$$J = e \cdot g(\theta) S / \int_0^n R^2 g(\theta) \sin\theta d\theta \quad (1)$$

the foregoing equation (1), e is a unit vector in the direction to the deposition source from the coordinate point, S denotes a sputtering speed, R denotes a distance between the deposition source and the coordinate point, $\theta$ denotes a depth angle from the deposition source, and $g(\theta)$ is an angle dependency of the flux discharged from the deposition source.

Next, an intersection 37 (Xcr, Yk, Zcr) between the straight line, connecting the deposition source 34 and the coordinate point 33, and the upper surface 36 of the contact hole 31 (Y=Yk) is obtained (step 207). Then, judgement is made if shadow effect is present or not (step 208). Here, when the coordinate in question is $$Xcr^2 + Zcr^2 > Ro^2$$

(Ro is a radius of the contact hole)
the flux does not incide for shadow effect.

When judgement is made that shadow effect will be caused, the process is returned to a step 205 to similarly perform judgement whether the shadow effect will be caused or not for other flux.

When judgement is made that shadow effect will not be caused, the moving magnitude Δr=(ΔX, ΔY) of the coordinate point is derived by $$\Delta X = K \times \Delta t \times Jx/|J|$$

$$\Delta Y = K \times \Delta t \times Jy/|J|$$

here, K is a constant, Δt is each time step. Also, the flux is assumed as J=(Jx, Jy, Jz).

After performing the process set forth above with respect to each flux, the process is repeated by selecting the coordinate point 38 after movement (step 210). Once the calculation is completed with respect to all of the coordinate points, the calculations are executed with respect to the next time step Δt. Similarly, at all of the time steps obtained by dividing processing period of the deposition process by the sputtering device, the foregoing operation is repeated (steps 211).

As set forth above, in the shown embodiment, the sectional configuration of the contact hole formed in the silicon wafer is calculated by the two-dimensional string model, and only judgements of the flux from the gas phase and the shadow effect are performed through three-dimensional calculation. Thus, shortening of calculation period can be shortened. As a result of simulation performed employing the shown embodiment, it has been found that the analysis of the configuration of the contact hole can be done in a calculation period 1/300 shorter in comparison with the three-dimensional analysis employing the conventional cell removal model.

Figure 4:
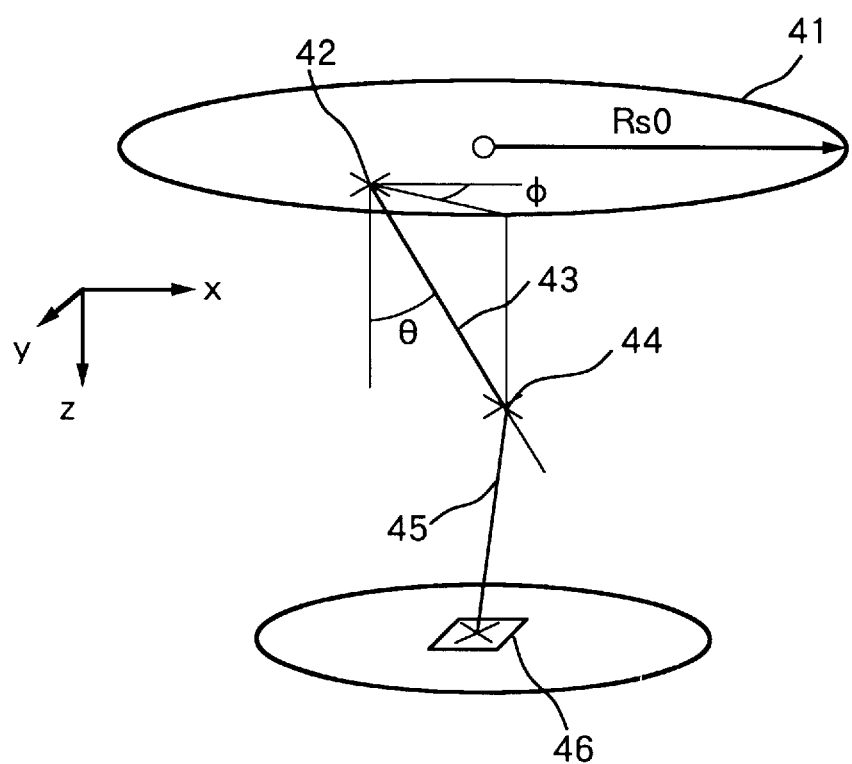
FIG. 4 is a conceptual illustration for the case where analysis of three-dimensional flux is performed by calculation of path of respective particles in deposition.

FIG. 4 is a conceptual illustration showing a condition where the path of the particle discharged from a target of sputter device in analysis of three dimensional flux in the gas phase in the shown embodiment is calculated employing Monte Carlo method.

In this application, a discharge position 42 of the particle from a sputter target 41 is determined using a random number. On the other hand, assuming that the energy of the discharged particle is derived by a Thompson's equation and the angular distribution of discharge of the particle is calculated with assuming that it is proportional to sinθ·cosθ, the path 43 of the particle after discharge is calculated. On the other hand, concerning collision between the particles, elastic collision is assumed to be caused and the sectional area of the collision is assumed to be constant. On the other hand, the position of the collision point is determined by employing the random number on the basis of poison distribution. On the other hand, the path 45 of the particle after collision is calculated with assumption of elastic scattering and constant sectional area of collision.

As set forth above, by employing the Monte Carlo method, the paths of a million of particles are calculated, for example. Within these paths, the path of the particle inciding in the constant region of the silicon wafer 46 is extracted. Then, the extracted path is assumed as constant flux inciding in each contact hole. Next, using the obtained result, simulation analysis of the configuration of the layer of the contact hole is performed by the shown embodiment. Upon performing analysis, in order to perform extraction of the flux to the selected coordinate position at the step 205, the value obtained by path calculation of the Monte Carlo method is used. The judgement of the shadow effect and calculation of the moving magnitude of the coordinate point in the case when no shadow effect is caused are similar to the process explained with reference to FIGS. 2 and 3.

Thus, by accurately studying the paths respective particles by the Monte Carlo method for performing analysis of three-dimensional flux in the gas phase, further accurate simulation can be performed. Furthermore, since the collision between the particles can be handled statistically, analysis becomes possible even in the high pressure region.

As set forth above, by employing the configuration simulating method according to the invention, the calculation period can be significantly shortened without degrading precision of analysis.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A configuration simulating method for a layer deposited on a silicon wafer comprising the steps of:

(a) generating a string of modeling data, obtained by connecting coordinate points on a contour of a section, wherein the section is obtained by cutting a plane perpendicular to an open surface of a cylindrical contact hole, for modeling a configuration of said cylindrical contact hole formed within said silicon wafer;

(b) extracting flux vectors, flowing into a predetermined one of said coordinate points on the string of modeling data, by analyzing a flux vector of particles to be deposited on said silicon wafer, wherein said particles are present in a gas phase;

(c) judging whether said flux vector becomes null due to a shadow effect related to said cylindrical contact hole; and (d) moving from said predetermined one of said coordinate points to another of said coordinate points corresponding to the projection of said flux vector on the plane, when said flux vector is judged as not becoming null.

2. A configuration simulating method as set forth in claim 1, which further comprises:

repeating steps (a) through (d) until all of the flux vector flowing into said coordinate point has been extracted; and repeating steps (a) through (d) until all coordinate points have been selected.

3. A configuration simulating method as set forth in claim 2, wherein said plane perpendicular to an open surface cuts a center line in a depth direction of said cylindrical contact hole.

4. A configuration simulating method as set forth in claim 3, wherein said step (c) further comprises:

deriving an intersection between (i) a straight line extending in a direction of the flux vector from said coordinate point and (ii) the open surface of said cylindrical contact hole; and judging whether said flux vector becomes null based on whether a distance from a center of the open surface to said intersection is greater than a radius of said open surface.

5. A configuration simulating method as set forth in claim 1, wherein analyzing said flux vector is based on the following equation:

$$J = e \cdot g(\theta) \ S/_0 \int^{\pi} R^2 g(\theta) \sin(\theta) \ d(\theta);$$

wherein e is a unit vector in a direction to a deposition source, S is a sputtering speed, R is a distance between said deposition source and said predetermined one of said coordinate points, θ is a depth angle from said deposition source, and g(θ) is an angle of dependency of flux.

6. A configuration simulating method as set forth in claim 5, wherein said plane perpendicular to an open surface cuts a center line in a depth direction of said cylindrical contact hole, and said step (c) further comprises:
deriving an intersection between (i) a straight line extending from said predetermined one of said coordinate points in the direction of said flux vector and (ii) the open surface of said cylindrical contact hole; and judging whether said flux vector becomes null based on whether a distance from a center of the open surface to said intersection by comparing the distance and a radius of the open surface.

7. A configuration simulating method as set forth in claim 1, wherein analyzing said flux vector is performed on the basis of paths of the particle statistically employing a Monte Carlo method.

8. A configuration simulating method as set forth in claim 7, wherein said plane perpendicular to an open surface cuts a center line in a depth direction of said cylindrical contact hole, and said step (c) further comprises:
deriving an intersection between (i) a the straight line extending from said predetermined one of said coordinate points in the direction of said flux vector and (ii) the open surface of said cylindrical contact hole; and judging whether said flux vector becomes null based on whether a distance from a center of the open surface to said intersection by comparing the distance and a radius of the open surface.

9. A configuration simulating method for a layer deposited on a silicon wafer comprising the steps of:

(a) generating a string of modeling data, obtained by connecting coordinate points on a contour of a section, wherein the section is obtained by cutting a plane perpendicular to an open surface of a cylindrical contact hole, for modeling a configuration of said cylindrical contact hole formed within said silicon wafer;

(b) extracting flux vectors, flowing into a predetermined one of said coordinate points on the string of modeling data, by analyzing a flux vector of particles to be deposited on said silicon wafer, wherein said particles are present in a gas phase;

(c) deriving an intersection of the straight line extended from said coordinate point in the direction of said flux vector;

(d) judging whether said flux vector becomes null due to a shadow effect related to said cylindrical contact hole;

(e) moving from said predetermined one of said coordinate points to another of said coordinate points corresponding to the projection of said flux vector on the plane, when said flux vector is judged as not becoming null;

(f) repeating steps (a) through (e) until all of the flux vector flowing into said coordinate point has been extracted; and (g) repeating steps (a) through (e) until all coordinate points have been selected.

10. A configuration simulating method as set forth in claim 9, wherein analyzing said flux vector is based on the following equation:

$$J = e \cdot g(\theta) \ S/_0 \int^{\pi} R^2 g(\theta) \sin(\theta) \ d(\theta);$$

wherein e is a unit vector in a direction to a deposition source, S is a sputtering speed, R is a distance between said deposition source and said predetermined one of said coordinate points, θ is a depth angle from said deposition source, and g(θ) is an angle of dependency of flux.

11. A configuration simulating method as set forth in claim 9, wherein said step (b) of extracting flux vectors includes a step of analyzing said flux vector on the basis of paths of particles statistically calculated employing the Monte Carlo method.

12. A configuration simulating system for a layer deposited on a silicon wafer comprising the steps of:

means for generating a string of modeling data, obtained by connecting coordinate points on a contour of a section, wherein the section is obtained by cutting a plane perpendicular to an open surface of a cylindrical contact hole, for modeling a configuration of said cylindrical contact hole formed within said silicon wafer;

means for extracting flux vectors, flowing into a predetermined one of said coordinate points on the string of modeling data, by analyzing a flux vector of particles to be deposited on said silicon wafer, wherein said particles are present in a gas phase;

means for judging whether said flux vector becomes null due to a shadow effect related to said cylindrical contact hole;

means for moving from said predetermined one of said coordinate points to another of said coordinate points corresponding to the projection of said flux vector on the plane, when said flux vector is judged as not becoming null; and means for executing until all coordinate points have been selected.

13. A configuration simulating system as set forth in claim 12, which further comprises:

means for judging whether said flux vector is null due to a shadow effect; and means for deriving an intersection between by comparing a distance from a center of the open surface of said cylindrical contact hole with a radius of said open surface of said cylindrical contact hole.

14. A configuration simulating system as set forth in claim 12, wherein analyzing said flux vector is based on the following equation:

$$J = e \cdot g(\theta) \ S/_0 \int^{\pi} R^2 g(\theta) \sin(\theta) \ d(\theta);$$

wherein e is a unit vector in a direction to a deposition source, S is a sputtering speed, R is a distance between said deposition source and said predetermined one of said coordinate points, $\theta$ is a depth angle from said deposition source, and $g(\theta)$ is an angle of dependency of flux.

15. A configuration simulating system as set forth in claim 13, wherein said analyzing said flux vector includes analysis of said flux vector on the basis of paths of the particles statistically calculated employing a Monte Carlo method.

* * * * *